Aug. 27, 1929.  G. S. BARROWS  1,726,285
RADIATOR
Filed June 16, 1926
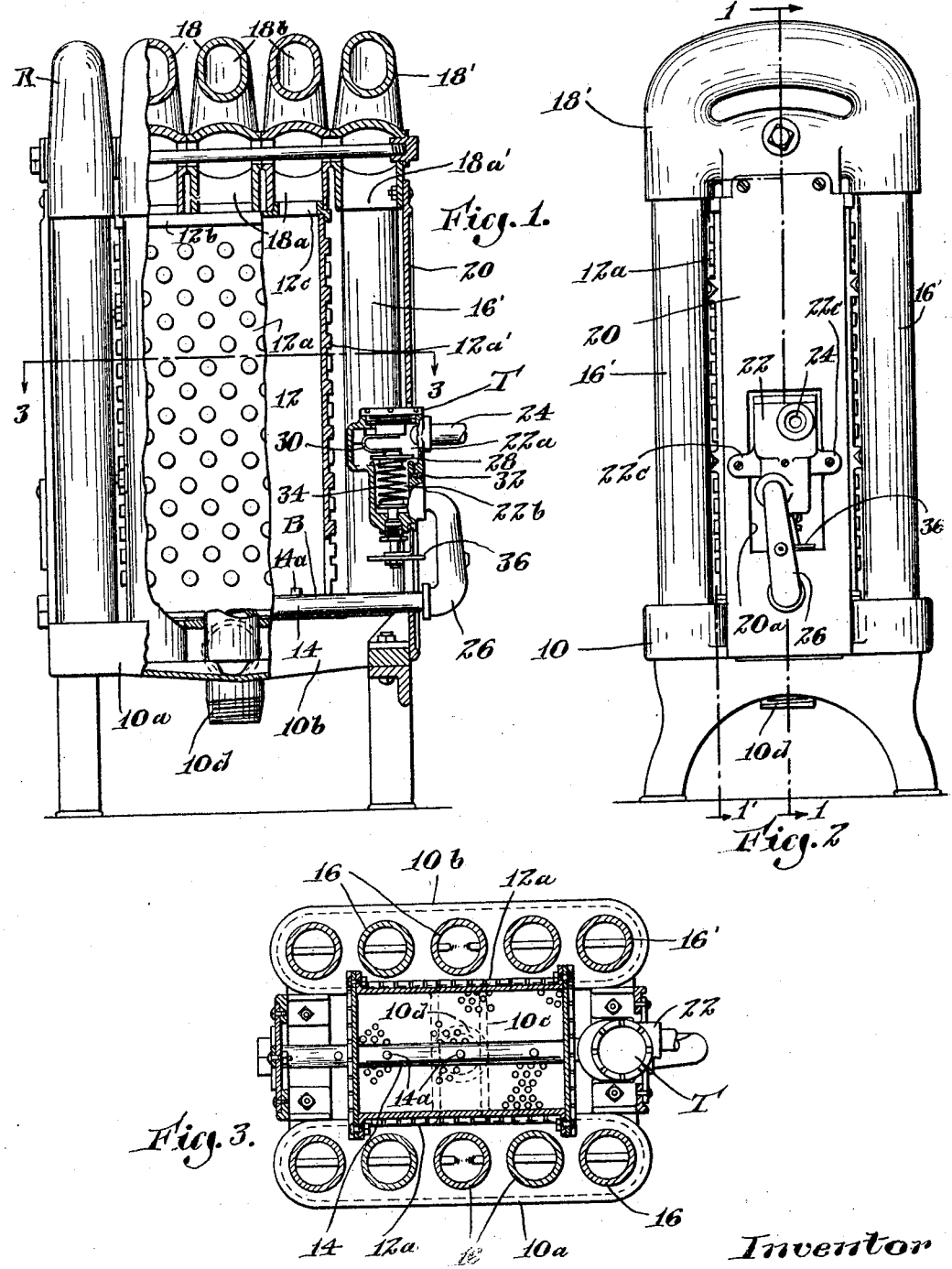
Inventor
George S. Barrows
by Mitchell, Chadwick & Kent
Attorneys Patented Aug. 27, 1929.

1,726,285

UNITED STATES PATENT OFFICE.

GEORGE S. BARROWS, OF PROVIDENCE, RHODE ISLAND, ASSIGNOR TO GENERAL FIRE EXTINGUISHER COMPANY, OF PROVIDENCE, RHODE ISLAND, A CORPORATION OF DELAWARE.

RADIATOR.

Application filed June 16, 1926. Serial No. 116,476.

This invention relates to apparatus for automatically controlling room temperature. It is herein described for the operation of a primary source of heat, e. g. a burner for fluid fuel, as gas, at a radiator in the room, to maintain the room temperature approximately constant at a predetermined level, by controlling the input of heat to the room through the radiator according to the average heat losses which the room experiences, through walls, windows, doors, etc.

It has long been customary to set a thermostat somewhere on the wall of a room to control heating apparatus located elsewhere in the room, so as to restore the predetermined temperature whenever a departure from it occurs; and it also has been proposed to apply a thermostat to the heating medium, as steam or hot water, so as to maintain the heating fluid within the radiator at a predetermined temperature. But with the thermostat on the wall the furnace or radiator is liable to become overheated, with danger and waste, in its effort to get the remote or unrepresentatively exposed thermostat up to the prescribed temperature; or it may become overheated merely because of the time interval required to warm a cold room in consequence of which the flame continues high even though the radiator is already heated as much as it should be and is heating the room at normal rate. Or, when the thermostat is applied to the water or steam, the thermostatically-maintained temperature of the heating medium is liable to supply more heat than the room requires.

The present invention guards against all of these evils. It does this at a minimum of cost for piping and thermostatic connections. It makes a heater which is a true "unit", in the sense that it is complete in itself as to flame location, operation and control. And it takes account of "average" conditions in the room and in the radiator. Because of this integrating quality it can be employed with a radiator wherein the heating medium has a fluctuating temperature ranging at various levels far above the temperature to which the thermostat is subjected, according to the needs of the room; and it will operate the radiator according to average needs of the room, not being overmuch affected either by a local coolness in some part of the room or by a general departure from normal which proves to be only temporary. In the example herein described the heating medium of the radiator is the hot products of combustion which the thermostat controls by turning up and turning down the gas fuel supply. Temperatures of the heating medium within such a radiator may be very high and may vary greatly, ranging for example from 500° to 1500° F.; and the radiator may have surface temperatures which at the same instant at different parts of the radiator vary from below 200° to above 400°; but it is not necessary that any of these temperatures be ascertained, nor that they be predetermined, nor be controlled by the apparatus so as to attain any certain figure; and yet it is a feature of the invention that such a fluctuating and indeterminate source of heat can be so controlled that its average output of heat into the apartment shall equal the average loss of heat from the apartment and so shall maintain approximately whatever comfortable living temperature shall have been predetermined by the setting of the thermostat.

The gradient of temperatures from a hot radiator, that is, the line representing temperatures at points which are successively more distant from the radiator wall, falls very steeply indeed in the first fraction of an inch of distance away from the radiator's surface. I have discovered that the steepness of this gradient can be modulated, on a particular side of the radiator where the invention is to be applied, so that these temperatures in the modulated gradient which are of an order corresponding to the critical operating temperatures of a thermostat employed in the invention can be made to lie at a substantially greater distance from the hot radiator surface, and can be made to fluctuate to and from the radiator through a relatively considerable distance. This allows room for a thermostat of practicable fuel-controlling size to be put at the said place and to be operated by the fluctuations of this modulated gradient past it. Assume, for example, that the room temperature several feet distant is 70° and that the thermostat is one which responds operatively to temperatures in the vicinity of 120°. This may be located with its axis two inches away from the hot wall and may be set so as to operate its gas valve when its temperature varies from the assumed critical temperature of 120°. Then the burning of gas in the radiator for a brief time will raise the temperature of the radiator walls so high that the 120° point in the modulated gradient is further from its hot surface than is the thermostat,—which means that the thermostat becomes of higher temperature than 120° and closes the gas supply valve. A gradual cooling of the radiator walls brings the 120° point in closer, the thermostat falling to 120°, and then lower, thus opening the gas valve, turning up the flame and again heating the radiator walls. Owing to this modulation of the gradient at this point, the isotherm of 120° around the radiator is at this point so much farther out than normal that it moves to and fro past such a thermostat so located and thus operates the gas valve. No particular critical temperature need be employed, nor need it be known exactly what the critical temperature of the thermostat is, for the latter is herein disclosed in a form which can be set to respond to various temperatures; but it should be distinctly above room temperature for it is a feature that the thermostat works on the steeper part of the gradient between radiator and room; and the room temperature of the instant is one element affecting the temperature gradient.

The modulation of temperature gradient may be affected in various ways. That which is illustrated is applied to a gas burning radiator of the type shown in the patent to Ira W. Knight, No. 1,433,955, of October 31, 1922. The thermostat is on one end of the radiator with a sort of heat conducting housing around it laterally which however does not prevent its being bathed by upward flow of air, while part indeed is directly exposed to room air. The thermostat thus is not directly subjected to the extreme changes of temperature which occur within the radiator, nor even to the temperature changes of the hot walls thereof, although it feels the effects of both. Its temperature is kept higher than if it were exposed in the air at equal distance from the radiator; and yet it is one-quarter exposed to air of the room; and three-quarters to other air of the room which flows freely upward, tempered by heat of adjacent parts of the radiator, heating it by convection; and at the same time it receives some heat by conduction and by radiation. In this way a sort of integration of the influence of room and radiator temperatures is applied to the thermostat.

The thermostat is so arranged and located that while it is influenced by the losses or gains of heat in the room and influenced by the degree of accumulation of heat in the radiator, both influences are indirect. If arranged to be controlled by the temperature of the heating medium, it would shut off the flame promptly whenever the flame starts, because the gases of combustion reach a high temperature quickly, long before the radiator has heated the room. On the other hand, if the thermostat were fully exposed to the atmospheric conditions adjacent to the radiator, drafts in the air might interfere seriously with its operating to check a dangerously increasing radiator temperature. But the controller receives and transmits a sample of the heat which the walls of the radiator are transmitting to the room, and it feels to a degree the reflex effect of the temperature conditions in the region to which that heat is being transmitted. As the temperatures of the radiator are themselves affected by the heat losses from the room, the heat relations are somewhat complicated, but the construction and operation of the control provided by the invention is simple and clear.

It is one feature that the controller introduces the element of time in adjusting the quantity of heat supplied to the quantity of heat demanded. As the demand may vary under local conditions of outdoor temperature, open windows, sunshine, other cooperating heaters, or what not, the thermostat responds to the integrated result by increasing or decreasing the valve opening for supply of fuel.

A radiator having the capacity necessary for raising the temperature of a cold room will give too much heat if operated continuously at full capacity after the room is warm. Preferably it is arranged for a certain minimum of gas to flow steadily to the burner, by-passing the controller; and it is a function of the controller to govern an additional supply to the same burner. The said minimum should be adjusted so that its combustion does not supply heat at more than the minimum rate of loss of heat from the apartment. Then the additional flow when admitted by the controller increases the temperature of the mixture within the radiator and of the radiator walls rather quickly to the maximum temperature which is to be permitted. The increased flow of heat from this to the room moves the temperature gradient outward and so operates the controller to turn down or even to shut off the additional flow of gas. The heat stored in the radiator walls at high temperature then passes only gradually into the room; and a considerable period, perhaps an hour, may pass before the heat flow falls to less than what is required. In some cases the turning up of the heat proves just equal to the supply needs of the room, and then for a long period the operation may be at a steady rate of gas flow. The demand of a cool room for more heat will not turn up the gas if the radiator is already hot, but will do so when the radiator has cooled enough; and coolness of the radiator will not turn up the gas if the room is already warm. The temperature gradient from radiator to room varies with change of temperature either in radiator or in room, but as the controller responds to changes in this gradient from each of these causes it may be said broadly that the action depends upon movements of that isotherm of the region adjacent to the radiator which corresponds to the critical temperature of the thermostatic valve control; and that for the purposes of the invention in its best form that particular isotherm is modulated, in the region where the thermostat is located, so that as to position, as to magnitude of oscillation and as to lag its movements can co-operate with the thermostat, the gas flame and the room temperature to produce and approximately to maintain the desired room temperature.

It is intended that the patent shall cover by suitable expression in the appended claims whatever features of patentable novelty exist in the invention disclosed.

In the accompanying drawings:

Figure 1 is a side elevation of a radiator and control apparatus therefor embodying the present invention; partly cut back to a medial section on line 1—1 of Figure 2, and in part only to line 1—1 of the same figure;

Figure 2 is an end elevation of the same;

Figure 3 is a plan, in section on line 3—3 of Figure 1.

Referring to the drawings, the apparatus comprises a radiator R heated directly by products of combustion flowing through it from a fluid fuel burner B within it and a thermo-responsive device T which controls the flow of fuel, assumed in this instance to be gas, to the burner. The radiator is of that type disclosed in the Knight patent hereinbefore mentioned and has a hollow base 10 made in H-shape, whose long parallel sides $10^a$ and $10^b$ are connected by a short tube $10^c$ having a discharge opening $10^d$. Wall plates $12^a$ resting on the inner edges of the base manifolds, and cover plates $12^b$ on them, make a single large combustion chamber 12. The burner B is a straight length of pipe 14 running horizontally along the bottom of this chamber 12 just above the level of the base manifolds, with upstanding outlet tips $14^a$ from each of which a yellow flame burns within the chamber.

Pipes 16 on each side of the combustion chamber stand over holes in the tops of the side portions of the base manifold, to which they lead products of combustion down from tubular headers 18 which connect the tops of each pair of opposite individual pipes. Each header has an underneath mid-opening $18^a$, which in the end headers is openable to atmosphere, but in the others is in register with corresponding openings $12^c$ in the cover plates. The very top of each header is a subsidiary cross passage $18^b$, which is not in the direct line of flow of hot gases, as explained in the Knight patent, to prevent the exposed top surfaces from attaining temperatures that are dangerous to contacting persons or things. The combustion chamber terminates just short of the end sections, thereby leaving a recess at each end of the radiator which is defined by the end pipes $16'$, their connecting header $18'$ and the end wall $12^{a\prime}$ of the combustion chamber.

In applying the invention to this radiator, it is a feature that this recess is converted into a sort of housing by an outside face plate 20 fastened at top and bottom to the header $18'$ and base 10 respectively, and laterally reaching nearly to the pipes $16'$. Partly within the space thus loosely housed and partly projecting through the face plate, is a thermostatic device T which controls the supply of fuel for combustion. Any suitable controller can be used for this purpose. That herein illustrated comprises a small casing 22 having an inlet chamber $22^a$ in its upper part connected with a fuel supply pipe 24 and having an outlet chamber $22^b$ in its lower part connected by pipe 26 with the burner B. Between these chambers is a valve 28 which can be seated by the expansive action of a U-shaped thermostatic spring bar 30, and thus can cut off the fuel from the burner except for a small quantity which is by-passed around the valve through passage 32 to maintain a low pilot flame always burning. A spring 34 in the lower or outlet chamber can be adjusted by an exterior hand wheel 36 to impose a force on the valve in opposition to that of the U-spring, whereby the actual temperature at which will occur a closing of the valve with consequent shutting off of the fual can be set as desired within the range of the thermostatic bar.

Lugs $22^c$ on the casing of the controller hold the same in position in an opening $20^a$ in the face plate 20, with about one fourth outside and three-fourths within the space behind the face plate, but preferably not touching the very hot wall $12^{a\prime}$ of the combustion chamber. If the casing should extend within so far as to touch the outside of this wall it would do so only tangentially and thus would acquire heat therefrom by conduction in only such a limited degree as would not prevent its due operation in accordance with the invention.

The products of combustion flow upward from the flame through the combustion chamber 12 into the cross headers 18, thence downward through the standing pipes 16 to the base manifolds $10^a$ and $10^b$, and thence they pass out through the discharge opening 10ᵈ. The parts of the radiator bathed by these moving products rapidly become hot and give off heat to the room. The end pipes 16′ and their headers 18′ are, however, much cooler since there is no direct flow of the products through them. In fact there may be a draft of air entering the underneath top opening 18ᵃ′ of the end header and moving along the end pipes to the base. Nevertheless the space within the housing formed by these end pipes 16′, the wall 12ᵃ′ of the combustion chamber and the face plate 20 is substantially heated, in part by radiation but mainly by convection as air flows up from the open bottom over the hot wall 12ᵃ′ and escapes along the sides or at top, between pipes, plate and headers. The thermo-responsive U-bar is thus affected. Its casing being exposed on one side to the open atmosphere of the room it is also affected by the room temperature as is also the plate 20. Accordingly the temperature of the controller is a composite or resultant of many influences prominent among which are the temperature of the radiator walls, and the room temperature.

The operation of the apparatus is as follows: Assume a cold room is to be heated. The hand wheel 36 having been set so that with the thermostatic bar spring cold the fuel valve 28 is open, gas is turned on at a main supply cock (not shown) in pipe 24 and the burner lighted. Very promptly temperature in the combustion chamber rises, possibly as high as 1200°, and the outer surfaces of parts of the radiator whose inner surfaces are in direct contact with the products of combustion will be heated say to 250° or 300°. Heat begins to pass to the room atmosphere, and in particular the temperatures in the space behind the face plate rise quickly and the controller is heated above room temperature yet by no means up to the temperature of the products of combustion, nor yet to that of the radiator skin. The critical temperature of controller, which may be assumed, for example, at 120°, at which it will close the valve 28, will be reached in a short time, because of its housing, whereupon the U-bar will flex enough to close the valve, thereby shutting off the main fuel flow but leaving a small flow through the by-pass 32. The heat supplied by this turned down flame is great enough to keep the radiator always heated to a moderate degree, as explained below. Meanwhile a quantity of heat has been stored in the metallic radiator walls, and this is "radiated" gradually into the room, by the usual processes, which include convection and some conduction, as well as radiation. This condition may continue for a considerable period, during which the main gas flow is shut off but the radiator is pouring heat into the room, and is remaining at such a temperature that it is not excessively hot, nor so cool as to cease its effectiveness, but is so hot that the controller is kept at or above its 120° critical temperature; although the room has not yet attained the desired warmth. When finally the controller temperature falls below the 120°, the U-bar opens the valve; and the flame is turned up again for a period. This cycle will be repeated continuously until the room is warm, and thereafter, with the flame remaining turned down so long as the room air effect on the controller, coupled with the effect thereon of heat received from the radiator both directly and indirectly, holds the controller at high enough temperature. The controller having been properly set by its hand wheel, according to the desire or comfort of the person in charge, a rise of general room temperature to the point, say 70°, to which this setting of the controller corresponds will hold up the temperature of the controller enough to keep the valve closed so long as a substantial flow of heat continues from the radiator, enough to maintain the isotherm of 120° more distant from the radiator than is the controller, at the particular point where the controller is. But if through cooling of the room, for example to 65°, the 120° point shrinks toward the radiator far enough to put the controller outside of it, the reduction of the temperature of the U-bar will contract it slightly, and consequently there will be an opening of the valve, to a degree, and the burner flame will be increased. In some instances the increase may be just enough to supply the heat currently being lost from the room, and then the flame may continue for a long period, steadily in balance as it were, or possibly with minor fluctuations, with the room maintained at a uniform temperature, and the radiator not heated to such an excessive temperature as calls for a turning down of the flame.

Should a window be opened, increasing the heat loss from the room, the more rapid flow of heat to the cooled part of the room makes a more rapid flow from the radiator and may actuate the controller, but will not do so unless the integration of influences at the controller indicates a need.

Bearing in mind that the rate of flow of heat from one body to another depends upon their difference of temperature, and also that lines radiating from a centre into a room become many times farther apart a few feet from the centre than they were at the centre, so that the heat which flows out from the radiator with a considerable temperature superiority at the start becomes spread out very thin a few feet away, it appears that a moderate change of temperature in the body of a room may correspond to a much multiplied temperature difference at the source whence heat is radiating to said main part of the room. A slight rise in the room in general doubtless reduces considerably the rate at which heat moves from a radiating centre having a given temperature; and air close to the radiator acquires a higher temperature, because the air or object beyond it do not so readily take heat. And although the greater part of a radiator's heat is disseminated by convection rather than by radiation, it is probably that similar effects exist, for the virility of the convection depends likewise upon temperature differences. Considering a naked radiator surface say at 300° temperature, the 120° region will be a little farther away from it in a warm room than in a cold room. And by providing a sort of partial shield, housing or protection, at a convenient place, the 120° region can be made to lie materially farther away, and to fluctuate through a relatively considerable distance with each change of temperature, either of the heat receiving or of the heat emitting body. Not only is the controller practically in the stream of flow of heat from radiator to room and experiencing at all times a sample of it, as the flow is at its particular point, but it effects a sort of averaging of conditions, for if a particular portion of the room be cooled more than the rest, that cooled part produces only its own proportional effect, along with all of the other parts which are not thus cooled, on the controller. And because of its power to hold the flame turned down, when the radiator is giving forth heat on an adequate scale, notwithstanding that the room is still too cool and needs more heat, it is able to average the performance of the radiator over duration of time, so that on the whole, over a period of time, the amount of heat delivered into the room substantially equals the amount demanded by the room because of losses of heat from the room during the period, such as a day. Inasmuch as general conditions in the room affect the radiator as a whole, the room conditions affect the controller not merely directly as above indicated but indirectly through the radiator itself.

As the action of the controller depends upon its own mechanical reaction to changes of temperature, the invention is not limited to any particular kind of thermostat. And it will be obvious that the critical temperature of the thermostat is not limited to any particular value, of which 120° was taken as an example. But having selected a thermostat of suitable mobility in response to temperature changes, the same may be arranged on any side of the radiator and with sufficient housing protection and at a sufficient distance from the skin of the radiator so that the changes of temperature at the point where it is located, consequent upon the described cycle of changes in radiator and in room temperature, are sufficient to operate a controller. To this end the mounting of the thermostatic valve movably with respect to its seat under control of an external hand wheel and with an intervening spring are devices which are helpful, the particular form of thermostatic controller herein illustrated and described being more fully disclosed and claimed in my co-pending application for patent Serial No. 88,153.

I claim as my invention:

1. Apparatus for controlling the temperature of a room, comprising, in combination, a radiator for the room; heat generating means at said radiator for heating the radiator; a thermostatic controller for varying the operation of said generating means; and a housing associated with the body of the radiator for producing a heated region, wherein is the thermostat, having a temperature far above the room temperature and far below the radiator wall temperature, exposed to heat influences of both room and radiator; said region being by said housing produced at a greater distance from the radiator hot wall than is the region of similar temperature normally found about said radiator.

2. Apparatus for controlling the temperature of a room, comprising, in combination, a radiator for the room; a burner and a fuel supply pipe therefor at said radiator for heating the radiator; a thermostatic controller for varying the operation of said burner; and a housing associated with the body of the radiator creating a restricted region, in a path of substantial heat flow from radiator to room, wherein the higher air temperatures which closely surround a radiator are made to extend to a greater distance than normal from the hot radiator wall; the thermostatic element of said controller being set in said region.

3. Apparatus for controlling the temperature of a room, comprising, in combination, a radiator for the room; a burner and a fuel supply pipe therefor at said radiator for heating the radiator; a thermostatic controller for varying the operation of said burner; and a housing overlying a part of the radiator surface but leaving the space between it and the radiator surface open to flow of air therethrough from the room for heating the room; said controller being set in a position exposed to said air thus heated.

4. Apparatus for controlling the temperature of a room, comprising, in combination, a radiator for the room; a burner and means supplying fuel thereto at said radiator for heating the radiator; a thermostatic controller for varying the operation of said burner; and a housing partially enclosing the thermostat of the controller in an enclosure with a hot part of the radiator and leaving it partially exposed to the room temperatures.

5. Apparatus for controlling the temperature of a room, comprising, in combination, a supply pipe and burner for a fluid comprising a primary source of heat within the room, a radiator for receiving and transmitting said heat to the room; a two-part passage for intake of the fluid; and a thermostatic controller for the control of a part of said passage, having its thermostatic element arranged for actuating the said control at a critical temperature of the thermostat which is far above the instant room temperature and far below the instant radiator temperature; the remaining part of said passage being free from control from said thermostat; and the said controller, radiator and respective division of the passage being organized with relation to each other and to the exposure of a thermostat to the heat conditions of the room by the setting of the thermostat in a certain positional relation to the outside of the radiator, with influence both of the radiator temperature and of the room temperature, said certain relation being such that when the room is cold and the radiator is heated to a normal maximum the relative strength of influence of the radiator will actuate the thermostat to shut off the controlled part of the passage; and that when the condition of the room is at a temperature of predetermined warmth the combined effect thereof and of the heat from fluid supply through the uncontrolled part of the passage, producing uncontrolled radiator heat, on the thermostat will have a relative strength of influence sufficient to actuate the thermostat to cut off the controlled part of the passage.

6. Apparatus for controlling the temperature of a room comprising, in combination, a burner within the room, a radiator receiving its products of combustion; a thermostatic controller; means whereby the said controller governs the flow of fuel to the burner; and housing means, for said controller and together with it an area of exterior surface of a part of said radiator which is confining said products of combustion, said housing leaving the controller exposed in part toward the room and covering it in part from exposure to the room.

7. Apparatus for controlling the temperature of a room comprising, in combination, a fluid burner; a tubular radiator receiving its products of combustion, the tubes thereof being arranged to form a radiator mass having externally a recess bounded partly by walls of the radiator confining the main flow of products of combustion therethrough and partly by walls of the radiator which have no contact with main flow of said products; a thermostat set with exposure partly within said recess and partly without it, whereby it is directly influenced both by the temperature within the recess and by the temperature of the room; and means whereby the thermostat controls the flow of fuel to the burner.

8. Apparatus for controlling the temperature of a room comprising, in combination, a fluid burner in the room; a radiator receiving its products of combustion, having a manifold base, plates resting on said base forming a combustion chamber over said burner; intermediate cross headers at the top of the chamber, and pipes thence downward to said manifold base; an end cross header not connected directly with said chamber, and pipes thence to said base forming side walls of an external recess next to the combustion chamber; a plate substantially closing the face of said recess; a thermostatic controller mounted on said plate and set in an opening therein, with a part exposed within the recess and facing the combustion chamber, and a part exposed outside of the plate and facing the room, whereby the thermostat is affected both by the temperatures in the recess and by those in the room; and means whereby the said controller controls the flow of fuel to the burner.

9. A combined heater and controller for affecting room temperature comprising, in combination, a fluid-fuel-burning tubular radiator heated directly by the products of combustion of the fuel and adapted to be set in the said room so as to transmit its heat to the room and to be effected in its own temperature by the room temperature; a thermo-responsive device attached to the radiator exteriorly and located and exposed to a degree within the mass confines of the radiator, arranged and exposed to have a temperature which is materially influenced both by the temperature of the radiator parts which confine the products of combustion and by the room temperature; and means controlled by said device for regulating the supply of fuel to the radiator, the whole co-acting to maintain the room temperature approximately at a value predetermined by the critical temperature at which the thermo-responsive device actuates its said control; and means to vary the setting of the thermostat, so that it responds at various critical temperatures in an operative range which lies between the range of room temperatures and the range of radiator temperatures.

10. Apparatus for controlling the temperature of a room, comprising, in combination, a heat radiator therefor, having locally an intermittently operating primary source of heat and a thermostatic controller for the operation of said source of heat; and a shield therefor; said controller being set close to the radiator in a path of substantial flow of heat from radiator to room, and its shield being set to provide a zone of superior influence of the radiator, wherein the thermostat is to a substantial degree shielded from the direct effect of room heat conditions and to provide a zone of superior influence of the room, wherein the thermostat is to a substantial degree shielded from the direct effect of radiator heat conditions, whereby the actual temperatures of the thermostat through its working range is an automatically integrated result of the instant radiator and room heat conditions.

Signed at Boston, Massachusetts, this 3rd day of June, 1926.

GEORGE S. BARROWS.